United States Patent [19]

Norcross

[11] 4,015,268
[45] Mar. 29, 1977

[54] RECORDING DEVICE WITH FLEXIBLE CHART

[75] Inventor: Austin S. Norcross, Waban, Mass.

[73] Assignee: Norcross Corporation, Newton, Mass.

[22] Filed: Mar. 15, 1976

[21] Appl. No.: 666,791

[52] U.S. Cl. .............................................. 346/137
[51] Int. Cl.² ........................................ G01D 15/34
[58] Field of Search .......................... 346/120–124, 346/137

[56] References Cited

UNITED STATES PATENTS

| | | | |
|---|---|---|---|
| 1,760,947 | 6/1930 | Healey | 346/137 |
| 2,600,822 | 6/1952 | Yarnall et al. | 346/137 UX |
| 3,524,194 | 8/1970 | Vogtlin | 346/137 X |
| 3,830,506 | 8/1974 | Ewert et al. | 346/137 X |
| 3,974,505 | 8/1976 | Rees | 346/137 X |

FOREIGN PATENTS OR APPLICATIONS 17,226  7/1912  United Kingdom ............... 346/137

*Primary Examiner*—George H. Miller, Jr.
*Attorney, Agent, or Firm*—Robert F. O'Connell

[57] ABSTRACT

A recording device using a circular chart wherein the major portion of the chart containing the central portion thereof is driven so as to rotate in a first plane, the lesser portion thereof being folded so as to rotate in a second plane angularly disposed, and preferably orthogonal, to the drive plane. A writing means, such as a stylus, is in writing contact with the chart on its major portion so that the recordal of information thereon occurs in the drive plane. The folded lesser portion of the chart is retained in place during rotation by the inner surface of one side of the case in which it is enclosed.

6 Claims, 5 Drawing Figures

RECORDING DEVICE WITH FLEXIBLE CHART

This invention relates to recording devices, or instruments, and, more particularly, to a recording device utilizing circular chart recording mechanisms.

Substantially all presently available circular chart recorders, which utilize a stylus or pen for producing a permanent record thereon, provide means for rotating the circular chart mounted therein in a single plane. Normally the chart is enclosed in a case having a rectangular glass window for exposing substantially the entire chart, as well as exposing certain portions of the mechanisms and circuitry related thereto which extend beyond the periphery of the chart.

In order to provide adequate visual representation of the recorded information, the circular charts are often relatively large and, accordingly, the overall structure in which they are housed during operation must be made relatively large to accommodate the chart as it rotates. In many applications, however, it is desirable that the instrument be used in environments where space becomes a problem and the use of large instruments becomes difficult or sometimes not possible. In order to permit the use of such instruments in relatively small spatial environments it is necessary to reduce the dimensions thereof in some manner.

A specific suggestion therefor is shown in U.S. Pat. No. 1,760,947, issued on June 3, 1930 to W. J. Healey. In the instrument shown therein a circular chart is caused to rotate in two mutually orthogonal planes, a major portion of the chart including the central portion thereof rotating in a first plane which is not presented to the viewer and a lesser portion thereof on which a record is to be made during operation, the lesser portion being driven so as to rotate in a plane perpendicular thereto. A writing stylus for recording information is caused to move substantially in the same plane as the lesser portion of the chart, the driving plane of the chart and the writing plane thereof being thereby orthogonally related.

The chart and stylus are enclosed in a case which has a rectangular window for exposing the narrow or lesser portion of the chart on which the stylus is recording. The case is arranged to project outwardly from a panel or switchboard, for example, on which the instrument is mounted so that a plurality of such instruments can be mounted side by side in a space which is purportedly reduced from that normally required for such instruments. The circular chart thereof is maintained in its mutually orthogonal planes by the use of an appropriate guide along the edge thereof where the chart is folded to form the orthogonal planes. A further slotted member associated with the stylus is required to retain the lesser, or narrow, portion of the chart in the desired plane so that the chart remains in a flattened out state and the stylus can effectively move over the surface thereof.

The structure of the aforementioned Healey patent requires that both planes of the chart be readily available so that the chart can be replaced and so that maintenance of the instrument can be performed. Accordingly, a sufficient amount of space must be made available between instruments which are adjacently mounted to permit both visual and manual access thereto at the driving plane thereof. Moreover, the case structure of the Healey instrument cannot be readily adapted for panel mounting wherein the exposed window is mounted substantially flush with the panel and the remaining portion of the instrument extends behind the panel. If the Healey instrument were so adapted the driving plane would be behind the panel and it would be substantially impractical to permit ready access thereto for changing the chart or for maintenance of the instrument.

BRIEF SUMMARY OF THE INVENTION

This invention overcomes the disadvantages of the Healey structure while permitting reduced spatial requirements for circular chart recording instruments utilizing a system in which the chart rotates in more than one plane. In accordance with the invention, and in contrast with the Healey instrument, the writing or stylus means coacting with the chart during recording thereof is mounted so as to move in the driving plane of the major portion of the chart as it rotates so that recording occurs on such major portion during operation. Accordingly, the writing and driving planes are coincidental. The case which encloses the chart, as well as enclosing the rotating and writing means, is arranged so that the inner surface of one side thereof, preferably the bottom side, is adjacent the lesser portion of the folded chart (orthogonal to the major portion thereof) and forms the means which retains the lesser portion in place during rotation thereof. No additional means is required either for retaining the chart at its folded edge or for maintaining the lesser portion thereof in its orthogonal plane.

The major portion of the chart is placed adjacent one side of the case having a semicircular window therein for exposing only such portion of the chart. Further, the case can be adapted for panel mounting wherein the window side thereof is mounted flush against the panel and the remaining portion of the instrument is behind the panel. The windowed side can then be formed in a hinged fashion so that, upon opening, the chart and drive mechanisms are readily accessible both for chart replacement and for maintenance of such mechanisms.

The structure of the invention can be described in more detail with the help of the accompanying drawing wherein FIG. 1 shows a front elevation view of a particular embodiment of the instrument of the invention with the hinged door thereof closed;

Figure 1:
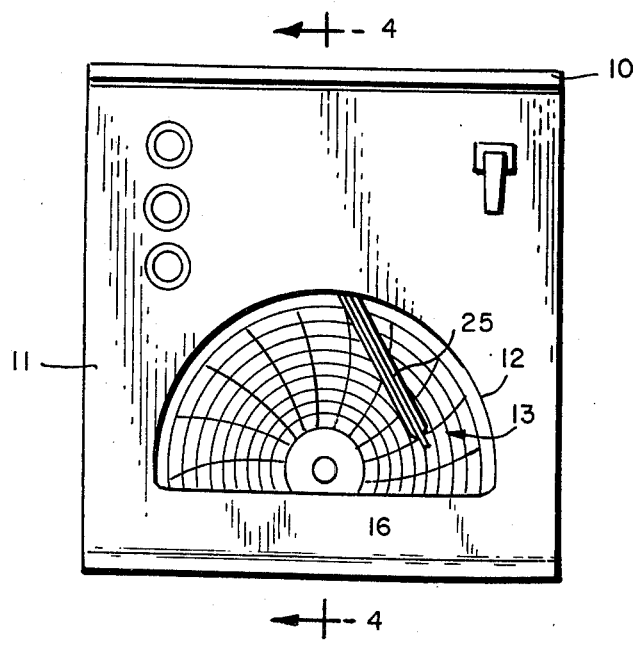
Figure 2:
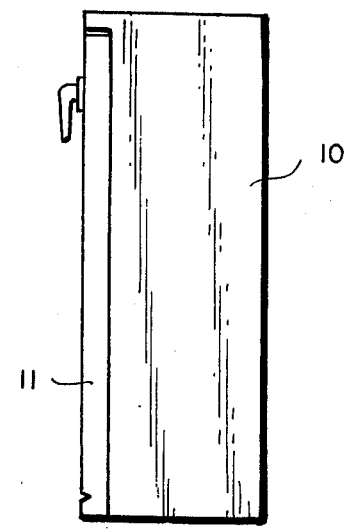
FIG. 2 shows a side elevation view of the embodiment of FIG. 1.
Figure 3:
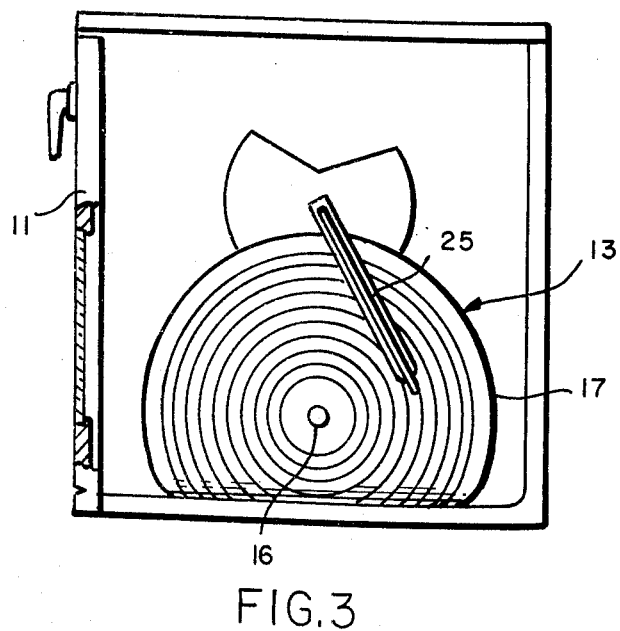
FIG. 3 shows a front elevation view of the embodiment of FIG. 1 with the hinged door open.
Figure 5:
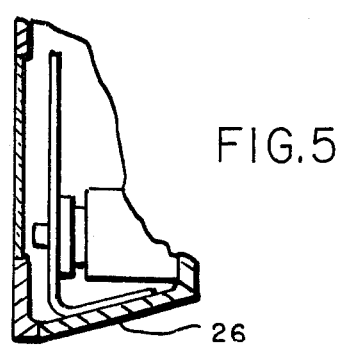

4 shows a partially cut-away side elevation view of a modification of the embodiment of FIGS. 1–3 with the door closed; and FIG. 5 shows a view of a portion of another modification of the invention.

As can be seen in FIGS. 1–4, the instrument of the invention comprises a case 10 having a hinged door 11 which has mounted therein a semicircular window 12 which may be covered with glass, for example, for viewing. A circular chart 13 is mounted within case 10, the central portion thereof being appropriately attached to the end of a shaft 14 of a drive motor 15 by a suitable knob, or clip, 16 as desired. The knob or clip is removable so that the chart can be placed on and removed from the end of the shaft in an easy manner.

The chart is mounted so that a first major portion 17 thereof lies in a first plane and a second lesser portion 18 thereof lies generally in a plane which is substantially orthogonal to plane 17. The chart is effectively rolled or folded as shown along a region 19 thereof. The lesser portion of the chart is in contact with the inner surface of one side, preferably the bottom side 20, of case 10. The rotation of shaft 14 by the drive motor permits rotation of the chart 13 in both planes, the lesser portion of the chart being suitably held in place during rotation solely by contact with the inner surface of the bottom of the housing, as shown. A suitable stylus 25 of any appropriate type known to those in the art is used to provide for visible recordal on the chart 13.

Figure 4:
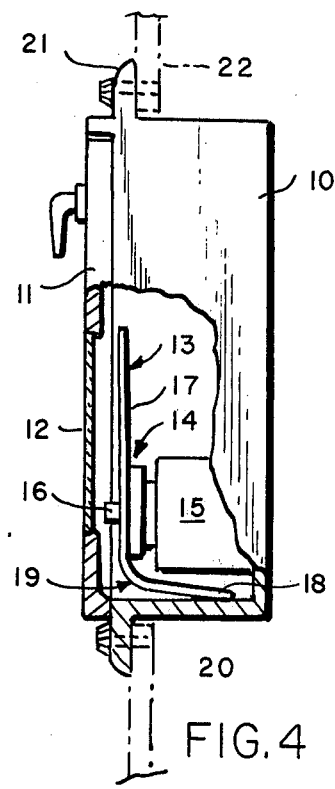

Although not limited thereto, the instrument can be readily adapted for panel mounting as shown in FIG. 4 by providing a flange 21, so that when it is mounted on a panel 22 (shown in phantom), the case and the mechanisms mounted therein extend behind the panel as shown. Even when so mounted the instrument becomes readily available for access by merely opening the hinged door 11. In such case the circular chart which, for example, may be a simple paper chart, can be readily replaced after removal of the knob 16 which attaches it to the shaft. Moreover, the mechanical and electrical portions of the instrument which are mounted therein also become easily available for maintenance purposes. Since the latter elements do not represent the essence of the invention, they are not shown in detail and would comprise elements well known to those in the chart recording and instrumentation art.

The window 12 of hinged door member 11 is in semi-circular form so that when the door is closed only the major portion of the chart 13 is exposed therethrough. Since the major portion is thereupon made visible, the recording history over a relatively long period of time is exposed for viewing. Thus, if the chart is arranged, as in many conventional chart recorders, for rotation once a day, more than one-half of the chart is always exposed so that a substantial part of the historical record for that day is readily visible to the viewer.

The configuration discussed above provides a reduction in the overall size of the instrument. While the bottom of the case is shown as substantially orthogonal to the front thereof, it is within the scope of the invention to form the case so that the side against which the lesser portion of the chart is retained forms other than a right angle. For example, as shown in FIG. 5 the bottom side may be other than 90° as depicted by the upwardly sloping portion 26 of the case which causes the lesser portion of the chart to fold along the same direction while still retaining its ability to rotate readily with the major portion thereof. Other modifications of the specific embodiments shown and discussed above may also occur to those in the art within the scope of the invention as set forth by the appended claims.

What is claimed is:

1. A recording device comprising
   a chart;
   means for rotating said chart so that a first major portion of said chart containing the central portion thereof rotates substantially in a first plane and a second lesser portion thereof rotates substantially in a second plane which is angularly disposed with respect to said first plane;
   recording means coacting with said chart during rotation thereof for placing recorded information on said major portion of said chart, said recording means being in contact with said major portion of said chart so that recordal occurs on said chart in said first plane; and
   means for enclosing said chart, said rotating means and said recording means, the inner surface of one side of said enclosing means being adjacent said portion of said chart and forming means for retaining said lesser portion in place during the rotation of said chart.

2. A recording device in accordance with claim 1 wherein said second plane is substantially orthogonal to said first plane.

3. A recording device in accordance with claim 2 wherein said enclosing means includes
   means for providing access to the interior of said enclosing means.

4. A recording device in accordance with claim 3 and further including means for retaining said chart on said rotating means so that said first plane is positioned substantially adjacent said access providing means and said inner surface is substantially orthogonal with respect to said access providing means.

5. A recording device in accordance with claim 3 wherein said chart has a circular configuration and further including a substantially semi-circular viewing window positioned in said access providing means substantially opposite the major position of said chart.

6. A recording device in accordance with claim 3 and further including means for permitting said device to be mounted on a panel member so that said access providing means is substantially flush with the exposed surface of said panel member.

* * * * *